United States Patent [19]

Scofield et al.

[11] 3,733,696

[45] May 22, 1973

[54] COMPOSITE CONDUCTOR BAR AND METHOD OF MANUFACTURING

[75] Inventors: Donald H. Scofield; James A. Corl, both of San Carlos, Calif.

[73] Assignee: Insul-8-Corp., San Carlos, Calif.

[22] Filed: Mar. 15, 1971

[21] Appl. No.: 124,551

Related U.S. Application Data

[62] Division of Ser. No. 771,931, Oct. 30, 1968.

[52] U.S. Cl. ..................29/624, 29/432, 29/525, 191/22, 191/33, 238/151
[51] Int. Cl. ..............................H01b 13/22
[58] Field of Search ..........................191/22, 23, 33; 238/151; 227/9, 10; 29/624, 630 E, 432, 421, 525, 526

[56] References Cited

UNITED STATES PATENTS

| 3,341,669 | 9/1967 | Martin et al | 191/29 DM |
| 3,366,334 | 1/1968 | Broske | 238/151 |
| 3,399,281 | 8/1968 | Corl | 191/29 DM X |
| 2,050,047 | 8/1936 | Febrey | 227/9 X |
| 2,590,585 | 3/1952 | Temple | 227/9 |

FOREIGN PATENTS OR APPLICATIONS

| 762,784 | 12/1956 | Great Britain | 174/94 |

*Primary Examiner*—Charles W. Lanham
*Assistant Examiner*—Joseph A. Walkowski
*Attorney*—Fowler, Knobbe & Martens

[57] ABSTRACT

An elongated structural steel cap which is slightly smaller than an extruded aluminum conductor bar is forced onto the bar and held in this position by nails explosively driven through the side legs of the cap end into the side walls of the conductor bar. Slots formed in the aluminum conductor bar permit the bar to be laterally distorted as the cap is forced onto the bar so that wide variations in the cap dimensions can be accommodated.

4 Claims, 7 Drawing Figures

PATENTED MAY 22 1973

INVENTORS.
JAMES A. CORL
DONALD H. SCOFIELD
BY FOWLER, KNOBBE
& MARTENS
ATTORNEYS.

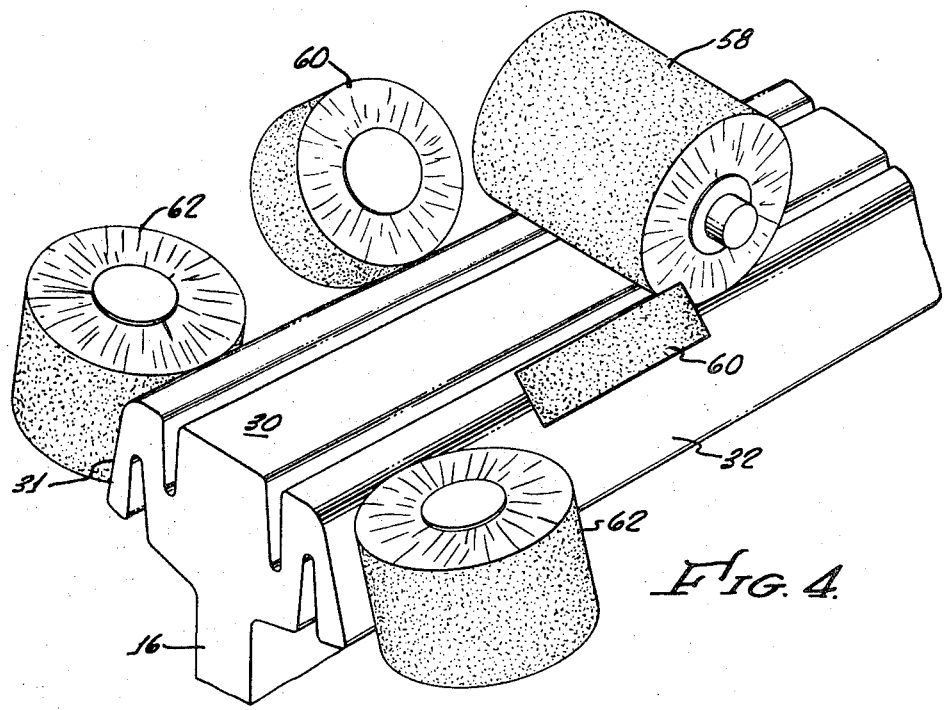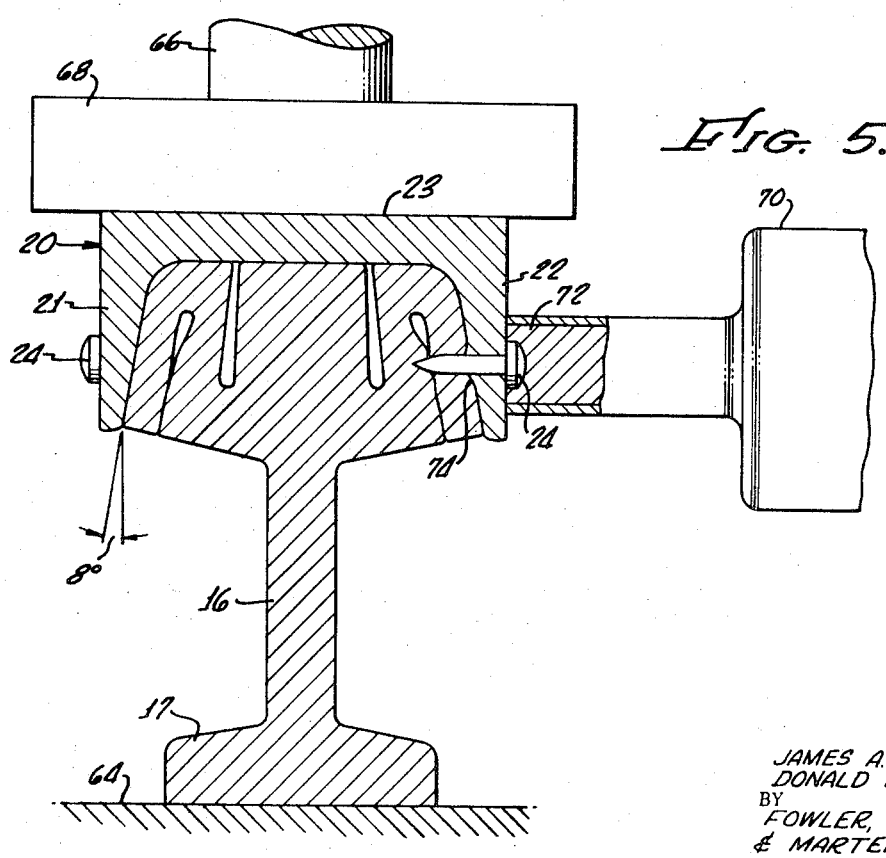

COMPOSITE CONDUCTOR BAR AND METHOD OF MANUFACTURING

This is a division of application Ser. No. 771,931, filed Oct. 30, 1968.

BACKGROUND OF THE INVENTION

This invention relates to electrical distribution systems wherein a current collector slides in contact with an electrical conductor, and more particularly relates to an improved composite conductor for such a system.

Mobile, or sliding contact, electrification systems are used extensively in industry to provide electrical power to mobile apparatus such as bridge cranes, trolley cars, etc. Generally, such systems include a conductor extending along the path of the mobile apparatus, and a current collector mounted to move with the apparatus. The conductor has an exposed face which is slideably contacted by the collector to supply power to the machinery.

In addition to low electrical resistance, a satisfactory conductor for such sliding contact systems must have a surface which makes a good electrical connection with the collector shoe and must be able to withstand the constant wear of the sliding collector shoe. Also, structural strength, low weight and low cost are desirable features. Cost is particularly significant in view of the large quantities of conductor bars required for many electrification systems.

Aluminum conductor bars have a relatively good combination of high structural strength, low electrical resistance, low weight and low cost in comparison with conductor bars of other metals, and are especially suitable for heavy duty installations such as steel mills and shipyard gantries where the conductors often must be large enough to carry currents on the order of 500 to 1,000 amperes or more. However, aluminum has severe disadvantages in a sliding contact system because aluminum oxide which forms on its surface is a very poor electrical conductor. Moreover, aluminum is soft and has a relatively high coefficient of friction, hence affords a poor wearing surface for sliding contact.

To overcome these shortcomings of aluminum, while still having the benefit of its many advantages, composite conductor bars have been made wherein a steel cap is attached to the aluminum bar so that the steel forms the contacting surface for the current collector. Steel, being much harder than aluminum, can, of course, withstand the constant wear of sliding contact much better than aluminum.

One difficulty which is encountered in providing an aluminum bar with a steel cap is that means must be provided to insure that current can be conducted from the aluminum bar to the sliding current collector with a minimum of increased resistance by virtue of the steel cap. In one known approach, holes are predrilled in the side legs of an extruded steel cap and aluminum plugs are then welded through the holes into the aluminum bar so that the welded plugs securely attach the cap to the bar. The welded aluminum plugs also make good electrical contact with the steel cap without having any undesirable oxidation of the aluminum. Consequently, most of the electrical transfer between the conductor bar and the cap is through the aluminum welds. While this approach has met with considerable success, it is still naturally desirable that the cost be reduced in that the predrilling and the actual welding process both add to the cost. Also the steel cap must be extruded to fit properly on the conductor bar while being subjected to extreme temperature variations, bearing in mind the different coefficients of expansion of the two metals. Hot rolled structural steel is less expensive. Another problem is that since most of the current flow is through the spot welds, there is some tendency for the welds to weaken after extended usage such that the cap may not remain securely attached to the conductor bar.

It has also been known that specially formed steel elements be attached to an aluminum conductor by means of bolts or welds through prepunched holes which extend completely through the conductor bar and the steel surface member. Such an arrangement is illustrated in U. S. Pat. No. 3,222,464. Again, while this approach has met with some success, elimination of special forming steps can reduce the cost.

In addition to being inexpensive, the means for attaching the cap to the bar should be simple so that it can be performed by relatively unskilled workers, and it naturally must be extremely reliable to meet the rugged operating conditions which such composite conductor bars may be subjected.

SUMMARY OF THE INVENTION

Briefly stated, the composite conductor bar of the invention includes an elongated bar of good electrically conductive material such as aluminum having a relatively large cross sectional area, the bar having a front wall, and a pair of opposite side walls. A generally U-shaped steel cap is forcefully engaged onto the conductor bar with its inner surface engaging the front and side walls of the bar. The cap is then securely attached to the bar by means of explosively driven nails which penetrate the side legs of the steel cap and embed in the aluminum side walls of the conductor bar. Nails are installed at spaced locations on both sides of the cap. Such nailing can be accomplished in an inexpensive manner without requiring any predrilling or other operation.

In the preferred form of the invention, the aluminum bar is formed with tapered side walls and with one or more pair of slots adjacent the side walls of the bar, the slots extending generally perpendicular to the front face of the conductor bar. With this construction, a steel cap is formed with a slightly smaller taper on the inner surface of the legs and with its inner width slightly smaller than the corresponding dimension of the conductor bar so that the cap must be forced onto the bar. The slots within the bar permit the bar to be laterally distorted so long as there is space into which the aluminum can move when the pressure is applied. The result is that the cap is then in good mechanical and electrical contact with the bar. While the cap is held in forceful engagement with the bar, a series of nails are driven into the composite conductor. The excellent contact is thus maintained in view of the tendency of the aluminum bar to attempt to spring back somewhat to its original shape. A major advantage of this construction is that low cost structural steel channels can be satisfactorily employed.

To further improve the electrical contact between the steel cap and the aluminum bar, a layer of conductive grease is applied to the bar before the cap is installed. The bar with the coating of grease is then brushed with steel brushes so as to scour the external surface and remove much of any aluminum oxide which may be present on the surface of the bar and to embed conductive grease into the unoxidized aluminum surfaces exposed by the brushing operation.

BRIEF DESCRIPTION OF THE DRAWINGS

FIG. 4 is a view similar to FIG. 3 illustrating the brushing operation for removing aluminum oxides;

FIG. 5 is an elevational view of the end of the composite conductor bar and a view of the pressing equipment and nailing apparatus illustrating the manner in which the nailing operation is performed;

DETAILED DESCRIPTION OF PREFERRED EMBODIMENTS OF THE INVENTION

Figure 1:
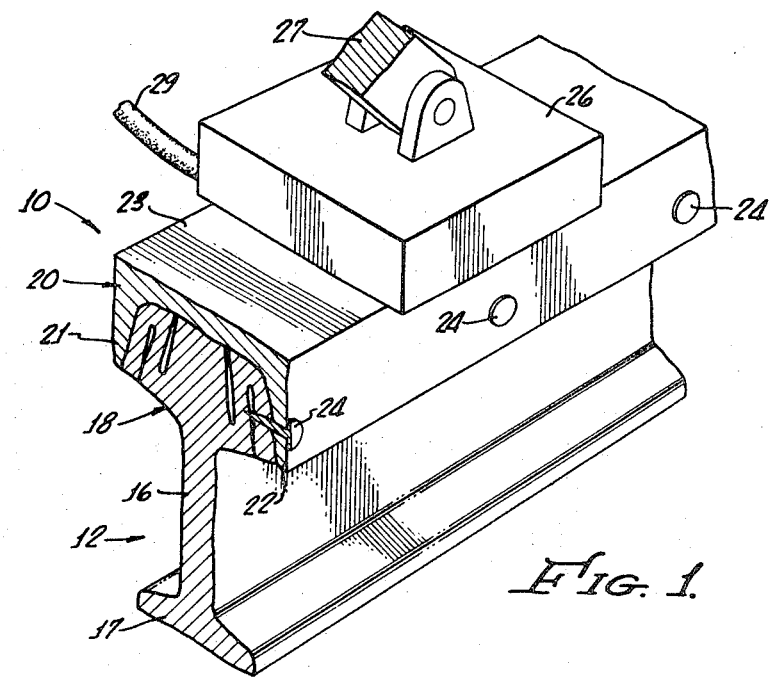
FIG. 1 is a perspective view of the composite conductor of the invention with one end of the conductor being shown in cross section to illustrate its construction.

Referring first to FIG. 1, the electrical conductor 10 of the invention may be seen to include an elongated aluminum bar 12 which is extruded with a cross sectional shape having a basic outline somewhat like that of an I-beam. The bar 12 includes a base 14 a central column 16 and an enlarged head 18 which represents the top portion of the so-called I-beam cross section.

Enclosing the top or front and side walls of the head 18 is an elongated structural steel channel or cap 20 which forms a wearing surface for the composite conductor 10. In accordance with the invention the generally U-shaped cap 20 is held in place by a plurality of longitudinally-spaced nails 24 extending through the side legs 21 and 22 of the cap and into the head 18 of the conductor bar 12.

The primary use for the conductor bar 10 is for conducting electricity to mobile equipment such as overhead cranes, hoists or similar equipment (not shown). The electricity is taken from the conductor by means of a large conductive collector shoe 26 mechanically connected to an arm 27 which is attached to the equipment using the electricity so that the shoe slides along the front or exterior surface of the center web 23 of the cap 20. The shoe is connected electrically by cables 29 to the equipment. The steel cap is employed to provide a wearing surface harder than aluminum which is a better conductor. Since it is necessary that the cu-rent pass from the aluminum bar into the steel cap, it is essential that good electrical contact be made between the bar and the cap.

Figure 2:
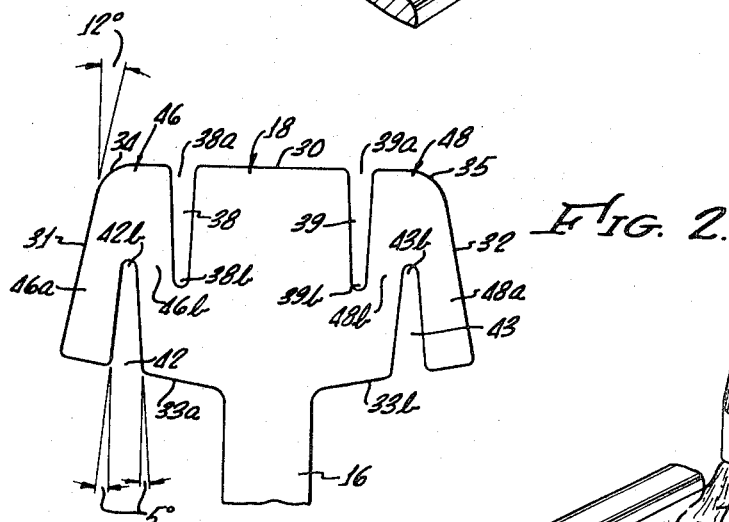
FIG. 2 is an enlarged cross sectional view of the conductor bar before the steel cap is applied to the bar.

The aluminum conductor bar 12 is initially extruded with its head portion 18 having the relatively large cross section illustrated in FIG. 2. This includes a generally flat top or front wall 30, a pair of opposite side walls 31 and 32, and a rear wall 33 formed in two sections 33a and 33b separated by the vertical column 16. The side walls 31 and 32 are formed to taper outwardly from the front wall 30 to the rear wall sections 33a and 33b. Although various tapers can be employed, as will be discussed below, a preferred amount is approximately 12° with respect to the vertical as viewed in FIG. 2.

A pair of elongated slots 38 and 39 are formed in the bar with the slot 38 being spaced inwardly from the side wall 31 and the slot 39 being spaced inwardly from the side wall 32. The slots 38 and 39 are oriented generally vertically as viewed in FIG. 2 and extend substantially perpendicularly with respect to the front wall 30. As can be seen, the open ends 38a and 39a of the two slots open to the front wall of the bar while the closed ends of the slots extend downwardly to a depth slightly more than one-half the distance to the rear wall 33. The side walls of the slots 38 and 39 taper outwardly slightly from the smaller closed ends 38b and 39b at an angle of approximately 5° with respect to the vertical as they extend to the front wall 30.

A second pair of slots 42 and 43 are also formed in the head 18 of the conductor bar 16 extending approximately parallel to the slots 38 and 39 and positioned between the side walls 31 and 32 and the slots 38 and 39. The lower ends of the slots 42 and 43 open respectively to the rear walls 33a and 33b while the closed ends 42b and 43b extend upwardly to be closer to the front wall 30 than the closed ends 38b and 39b of the slots 38 and 39. Thus in effect the closed ends of the slots overlap in a vertical direction without intersecting. Consequently, some portion of a slot extends from the front wall to the rear wall for the entire length of the side walls 31 and 32.

The side portions of the conductor bar head 18 are essentially formed into wings 46 and 47 composed of sections 46a and 46b and 48a and 48b. Section 46a is attached in cantilever fashion at its upper or front end to the upper or front end of the section 46b. The section 46b in turn is connected in cantilever fashion to the central portion of the head 18. Similarly, the outer section 48a on the conductor bar wing 48 is connected in cantilever fashion at its upper end to the inner section or column 48b, which in turn is connected in cantilever fashion at its lower end to the central portion of the conductor head 18. As a result of the slots and the cantilever connections formed thereby, the wings 46 and 48 can be distorted or telescoped inwardly somewhat in accordion fashion if sufficient force is applied.

Figure 3:
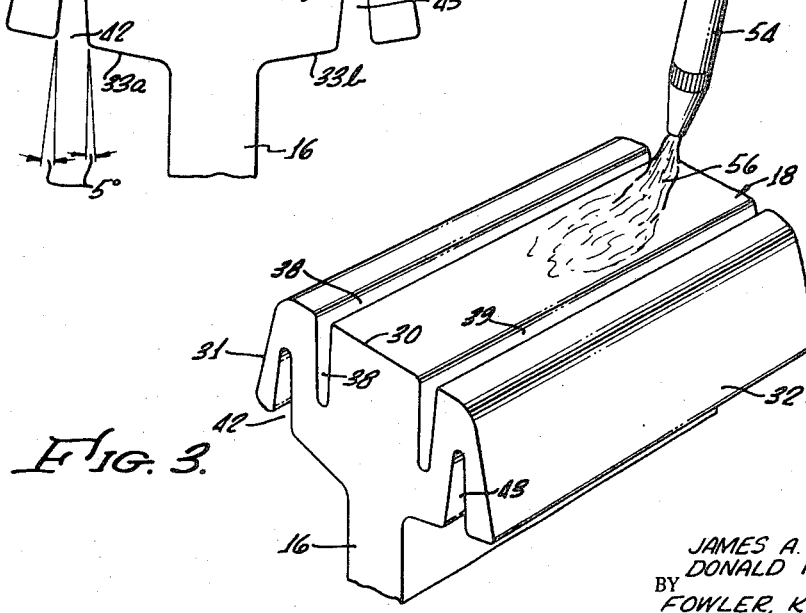
FIG. 3 is a perspective view of the bar of FIG. 2 illustrating the conductive grease applying step of the method of the invention.

Since it is difficult to conduct electricity between an aluminum and steel interface, there are some intermediate steps to be taken. Referring to FIG. 3 there is shown a dispensing nozzle 54 through which a conductive grease 56 is applied onto the top or front surface of the conductor bar. There are a variety of such grease-like conductive materials presently available. In addition to being highly conductive, they are quite viscous and have the capability to withstand relatively high temperatures. One example of a suitable grease presently available is sold by Alcoa under the identification EJC-2.

As the next step there is shown in FIG. 4 a horizontally mounted circular brush 58 having bristles made of stainless steel engaging the front surface 30 of the conductor bar. A similar pair of circular brushes 60 are mounted to engage the front corners 34 and 35 of the conductor bar and another pair of brushes 62 are generally vertically oriented to engage the side walls of the conductor bar. The brushes slowly rotate at a speed of approximately about 200 revolutions per minute while the conductor bar is drawn between the rollers.

The brushes scour the surfaces of the front and side walls of the conductor bar removing much of any aluminum oxide formed thereon. Secondly, the brushes distribute the conductive grease so that the front and side walls are substantially coated with the grease. Since the aluminum oxide is removed by the brushing operation, the grease is thus placed directly in contact with the unoxidized aluminum. Since aluminum oxide is a good insulator, this operation therefore eliminates this layer of insulation, prevents additional oxidation of the aluminum, and provides a conductive medium to compensate for any imperfections in the mechanical connection between the mating surfaces.

As the next step of the operation, the steel cap 20 is to be forced onto the conductor bar 12 to the position shown in FIGS. 1 and 5. The steel cap should preferably have been previously scoured or sandblasted to remove any scale or foreign matter which may have accumulated on the cap. As previously explained, the cap is made of a low cost structural steel channel which has been hot rolled formed, this being the least expensive type steel channel available. Channels formed by hot rolling frequently have considerable scale collected on their exterior surfaces particularly if they have been in storage for a considerable period of time. In addition to a mechanical scouring step, a chemical bath may be used if desired to further clean the metal.

The side legs 20 and 21 of the structural steel cap have exterior surfaces which are approximately perpendicular to the exterior surface of the center web 23. The inner generally U-shaped surface of the cap includes a flat inner surface on the center section 23 which is approximately parallel to the outer surface of the center section. The inner surfaces of the side legs 21 and 22 however taper outwardly from the center web 23 at an angle of approximately 8°, as illustrated in FIG. 5. This taper occurs as the result of the rolling equipment employed in forming the channel.

The front end of the conductor bar 12 is extruded to a dimension smaller than the entry to the open end of the steel cap so that the cap will fit partially onto the conductor bar. However, since the side walls 31 and 32 of the conductor bar taper outwardly at an angle of approximately 12°, further downward movement of the cap results in interference between the cap legs, having an 8° taper, and the side walls of the conductor bar before the inner surface of the cap center web 23 is bottomed or engaged on the front wall 30 of the conductor bar. Consequently, it is necessary to force the cap onto the bar by means of external pressure.

As shown in FIG. 5, this is accomplished by placing the conductor bar on a supporting surface 64 and applying pressure to the cap 20 by suitable means such as a hydraulic piston 66 and pressure plate 68. Equipment having a pressure capability of 30,000 pounds per lineal foot of conductor bar has been found to be more than adequate to press the cap onto the bar. It is understood of course that in view of the angles involved with the cap and the side walls of the conductor bar, considerably less force than 30,000 pounds is actually applied to the side walls of the conductor bar. In operation, the pressure can be applied to the cap and the bar in various ways. If desired an entire section of cap can be pressed onto a rail at a given time if sufficient pressure equipment is employed, or, more practically, a pair of pistons and pressure plates spaced a convenient distance apart along the rail can be employed to press sequentially sections of the cap onto the conductor bar.

Hot rolled structural steel channels such as that employed for the steel cap 20 have considerable tolerances in their dimensions between the interior surfaces of the side legs 21 and 22. This is not only true from one batch of steel to another and from one manufacturer to another but also considerable variation can occasionally be found on a given section of steel channel. In accordance with the invention, the conductor bar has been designed to receive a channel or cap having the smallest expected internal dimension for a given nominal size of channel and to also receive the channel having the largest expected dimension while still obtaining good electrical and mechanical contact between the cap and the bar. In practice, it has been found that the lateral variation of the interior dimension of the cap or channel 20 may be more than one-fourth of an inch. Consequently, the combined width of the slots 38, 39, 42 and 43 is equal to or greater than this amount. In a preferred example the slots were made with a closed end radius of approximately one-eighth, widening to one-fourth of an inch at the open end.

In accordance with the invention, the aluminum conductor bar has been designed to accommodate such variations. As the steel cap is forced downwardly by the hydraulic piston 66 and its pressure plate 68, the side legs 21 and 22 of the steel cap engage the side walls 31 and 32 of the aluminum bar and force or distort the wings 46 and 48 laterally inwardly to the position shown in FIG. 5 wherein the entire inner surface of the steel cap is in good electrical and mechanical contact with the front wall 30 and side walls 31 and 32 of the conductor bar. As can be seen by comparing FIG. 2 and FIG. 5, the slots 38, 39, 42 and 43 permit this lateral distortion. A completely solid conductor bar can of course not be compressed or distorted in such manner. The important point is that space must be provided for the aluminum to move wherever there will be interference between the cap and the conductor bar.

As a result of the interference between the cap and the conductor, good electrical and mechanical contact is made between large areas of the conductor bar and the steel cap. One side factor contributing to the good electrical contact is that the legs of the cap 20 tend to wipe or scrape the side walls of the conductor bar as the cap is moved onto the bar; hence advantageously any oxidized aluminum which may have remained after the brushing operation is likely to be removed in the area scraped by the cap.

As the next step of the invention, it is necessary to secure the cap in the position wherein it is in forceful engagement with the conductor bar. The conductor bar has considerable springiness or memory such that if the pressure on the steel cap is removed before securing the steel cap to the conductor bar, the steel cap would pop upwardly part way off of the conductor bar. Accordingly, it is necessary that pressure be maintained while the cap is being attached to the conductor bar. The nail tips 24 are driven through the side legs of the steel cap and embedded in the conductor bar with the nail head engaging the outer surface of the cap leg. Such an operation can be performed by an explosively powered tool 70 shown in FIG. 5. The tool includes a piston 72 which is driven forwardly by triggering an explosive charge to drive the nail 24 into the cap and the conductor bar.

The pressing and nailing step is repeated for the length of the bar with the nails preferably spaced between 6 and 12 inches apart on both sides of the steel cap, and they are staggered between the sides. The nails should be located sufficiently far from the free ends of the cap legs to obtain sufficient strength and to prevent distortion of the cap from appearing along the lower edge of the cap legs. Preferably, the nail should be about one-half inch from the free ends of the cap leg with the cap illustrated.

Note from FIG. 5 that the nails 24 extend completely through the side legs and the outer sections 46a and 48a of the conductor bar. Depending upon the dimensions involved the points of the nails may partially penetrate the next sections of the bar.

It has been found that the nails 24 hold the cap to the aluminum conductor bar in a very positive fashion. The nails themselves provide most of the holding force in friction with the aluminum and steel, but in addition it should be noted from FIG. 5 that the inner portion 74 of the cap leg surrounding the nail is extruded or cold formed into a mating recess in the side wall of the conductor bar. That is, the conductor bar is distorted by the portion 74 of the cap extruded into its surface. This extruded portion 74 also adds to the positive nature of the attachment obtained.

In addition, it is believed that the frictional heat developed as the nail is driven through the two metals causes expansions in the lattice structure of the adjacent metal molecules, with the result that interdiffusion between the molecules develops. This, in turn, adds to the strength of the connection. This positive connection plus the spring back characteristics of the aluminum enable good electrical contact between the cap and the conductor to be maintained throughout the various temperature extremes to which a conductor rail of this type may be subjected bearing in mind the different coefficients of expansion for aluminum and steel. It should be appreciated also that good electrical contact is maintained substantially throughout the entire inner surface of the steel cap and the mating surfaces of the conductor bar in view of the pressure applied to the cap and the bar during the nailing operation. Also the presence of the conductive grease compensates for any mechanical imperfections in the mating surfaces.

In a preferred example of the invention, the aluminum alloy used for the conductor bar is that identified as ASTM No. 6063-T6, which has excellent conductivity characteristics. The steel cap employed was 1018 hot rolled structural steel.

The nails employed must of course be harder than the steel cap in order to penetrate the cap. Also, they should have sufficient size to withstand the forces involved. With a conductor bar having a head dimension of approximately 1½ inches by 2½ inches and the cap having leg thickness of about one-fourth inch at the point of penetration, a nail having an overall length of about three-fourths inches and a diameter of about five thirty-seconds inches has been found satisfactory.

While a variety of explosively driven nailing tools are currently available on the market, a model found to be particularly satisfactory is sold under the trademark Hilti made by Fastening Systems of Stamford, Connecticut, the model number being DX100-L. Generally similar equipment is sold under the trademark Ramset by Olin Mathieson Chemical Corporation.

The composite conductors are typically shipped in sections to the site where they are to be used and then assembled into the necessary lengths. Splices or joints between adjacent sections of the conductor bar are conveniently formed by attaching splice sections to adjacent central columns 16 of the adjacent conductor rails. The rear wall sections 33a and 33b together with the upper surfaces of the base 14 are conveniently tapered to facilitate insertion of the splice sections.

EMBODIMENT OF FIG. 6

Figure 6:
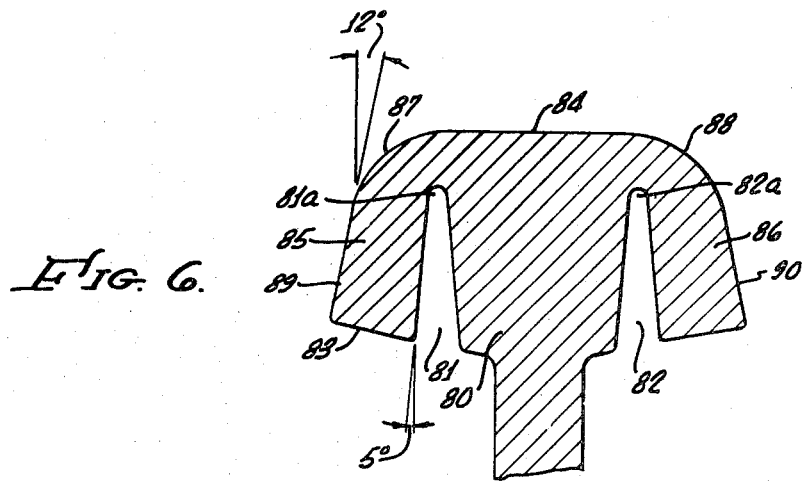
FIG. 6 is an enlarged cross sectional view of another embodiment of the conductor bar of the invention before a cap is applied.

In FIG. 6, the head 80 of an aluminum conductor bar is extruded with a single pair of elongated slots 81 and 82 which open to the rear wall 83 of the bar and extend generally perpendicular to the front wall 84. The closed ends 81a and 82a of the bar terminate adjacent to but spaced from the front wall. By way of example, in one arrangement this distance is about three-eighths of an inch, with the slot being about an inch in length and tapering outwardly slightly from the closed ends to rear wall. The slots define a pair of side wings 85 and 86 attached in cantilever fashion at their upper ends to the central portion of the head 80.

The corners 87 and 88 between the front wall 84 and the sidewalls 89 and 90 gently curve through an arc having a radius of approximately three-fourths of an inch. The sidewalls 89 and 90 taper outwardly toward the rear wall 83 at an angle of approximately 12° with respect to the vertical, which is perpendicular to the front wall 84.

Figure 7:
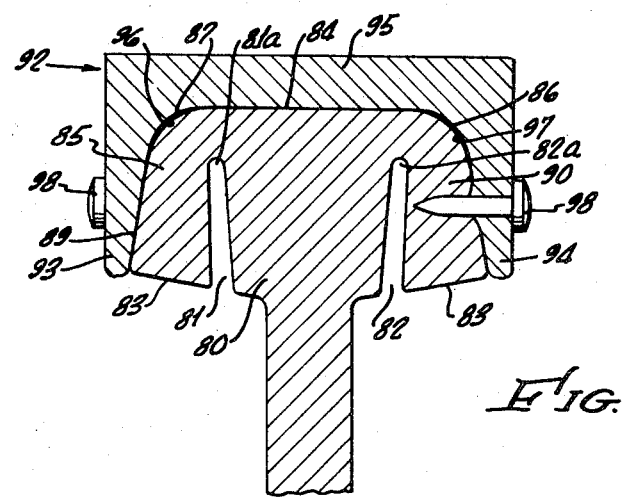
FIG. 7 shows the cap of FIG. 6 after a bar is forced thereon.

Referring to FIG. 7, the cap 92 is identical to the cap discussed in FIGS. 1–5 having a generally U-shaped interior surface including side legs 93 and 94 having interior surfaces which taper outwardly towards the open end of the cap at an angle of approximately 8° with respect to the vertical, which is perpendicular to the exterior surface of the web 95 of the cap. The exterior surface of the cap and the interior surface of the cap web are generally flat. The interior corners 96 and 97 are curved more sharply than the curved corners 87 and 88 of the bar, being about one-fourth to three-eighths inch in the example given. The dimensions of the conductor bar head 80 are such that the open end of cap 92 will fit partially onto the head 80 so that the cap legs will engage the corners 87 and 88 or the sidewalls 89 and 90 of the conductor bar at a point below the closed slot ends 81a and 82a. Further movement is resisted because of the interference caused by the differing tapers on the conductor bar and the cap. It should be understood that the greasing and scouring steps discussed above are performed on the bar before the cap is placed on the bar.

By forcing the cap onto the conductor bar through pressure applied to the cap, the side legs 93 and 94 of the cap force the cantilever wings 85 and 86 on the conductor bar inwardly about their upper ends to the position shown in FIG. 7 wherein the side legs 93 and 94 of the cap forcefully engage the sidewalls 89 and 90 of the conductor bar and the inner wall surface of the cap web 95 engages the flat upper or front surface 84 of the conductor bar. This inward distortion of the wings 85 and 86 is permitted by virtue of slots 81 and 82 formed in the conductor bar. Since the corners 87 and 88 of the conductor bar are more gently curved than the inner corners 96 and 97 of the cap 92, the cap as shown in FIG. 7 does not completely forcefully engage the corners 87 and 88 of the conductor bar. Note also that the slot ends 81a and 82a spaced approximately three-eighths of an inch from the wall 84 overlap or extend into the area defined by the three-fourths inch radius forming the curve for the corners 87 and 88. Consequently, the corners and the slots together permit the wings to be distorted inwardly sufficiently so that caps varying considerably in width can be forced onto the conductor bar in good contact with the bar. The important point is that there be space for the aluminum to be distorted into when forced by the cap. If the cap 92 were to meet the resistance of solid aluminum across the conductor bar, the cap could not be forced onto the bar with the forces contemplated.

A significant advantage of the arrangement of FIGS. 6 and 7 is that employing a single pair of slots in the conductor bar presents a simple extrusion process for the bar. Although the amount of good surface contact between the conductor bar and the cap is on the average perhaps slightly less than in the previous embodiment, it will be appreciated that very substantial areas of the bar are still in good contact with the cap.

The cap is held in forceful engagement with the conductor bar by explosively firing a plurality of nails 98 through the legs of the cap and into the wings 85 and 86 of the conductor bar, as in the previous embodiment. Note, however, that the wings 85 and 86 are sufficiently thick that the nail 98 terminates within the wing.

What is claimed is:

1. The method of making a composite electrical conductor formed of an elongated bar made of good electrically conductive material and a ferrous metal cap providing a hardened surface for contact with a sliding current collector shoe comprising the steps of:
   extruding an elongated aluminum conductor bar with a pair of slots each spaced from a respective one of the opposite side walls of the bar extending somewhat parallel to the side walls;
   forming said cap with a generally U-shape with the cap side legs being spaced to create an interference fit with the bar;
   forcing the cap onto the bar with the inner surfaces of the cap engaging the front and opposite sides of the conductor bar, the side walls of the bar being laterally distorted as allowed by the presence of the slots; and
   nailing the side legs of the cap to the side walls of the conductor bar while the cap is held under pressure in forceful engagement with the conductor bar, the nailing being accomplished by firing the nails by means of explosives through the cap legs and into the conductor bar so that the cap remains in good electrical and mechanical contact with the conductor bar when the force applied to the cap and the bar is released.

2. The method of claim 1 including the steps of:
   applying a coating of conductive grease to the conductor bar before installing the cap onto the bar; and
   brushing the conductor bar to remove oxides and to apply the conductive grease to unoxidized surfaces of the conductor bar.

3. The method of claim 1 wherein the step of forcing the cap into engagement with the conductor bar includes the steps of:
   placing the conductor bar against a solid support surface;
   placing the cap onto the conductor bar; and
   applying pressure against the front of the cap towards the bar to force the cap onto the bar.

4. The method of making a composite electrical conductor formed of an elongated bar made of good electrically conductive material and a cap made of electrically conductive material which is harder than the bar providing a hardened surface for contact with a current collector shoe comprising the steps of:
   extruding the bar with elongated slot means for permitting distortion of the bar;
   forming the cap with said surface for contacting the collector shoe and with leg means for creating an interference fit with the bar;
   forcing the cap into engagement with the bar, said slot means permitting distortion of the bar to accommodate the interference caused by the leg means; and
   nailing the cap and the bar together while the cap is held under pressure in forceful engagement with the bar so that the cap remains in good mechanical and electrical contact with the bar when the force applied to the cap and the bar is released, the nails being positioned such that they extend generally transversely to the leg means and the slot means.

* * * * *